UNITED STATES PATENT OFFICE.

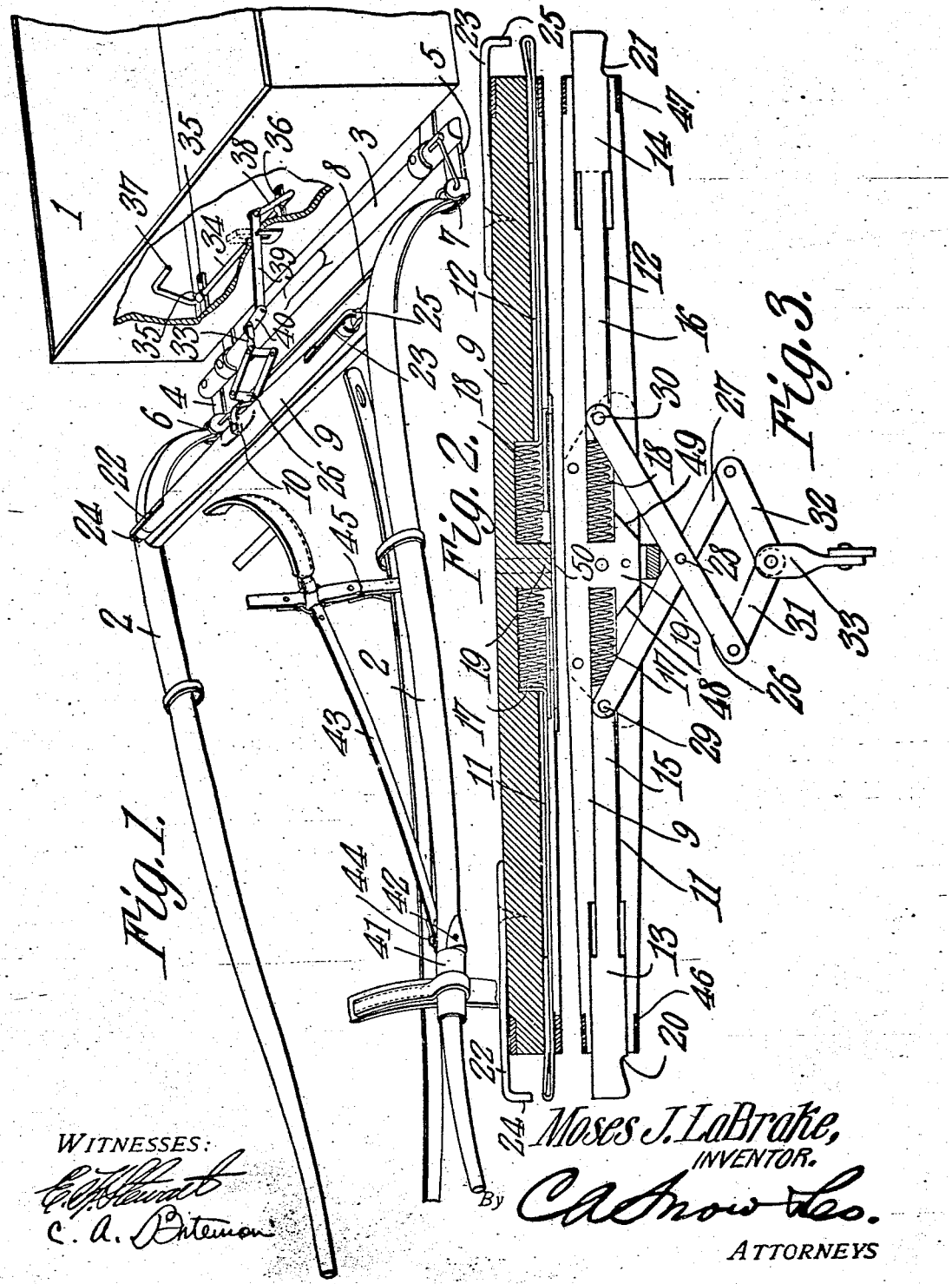

MOSES J. LA BRAKE, OF BLOOMINGDALE, NEW YORK, ASSIGNOR OF ONE-HALF TO JULIUS Q. KING, OF GABRIELS, NEW YORK.

HORSE-DETACHER.

No. 899,223.   Specification of Letters Patent.   Patented Sept. 22, 1908.

Application filed May 6, 1907. Serial No. 372,155.

*To all whom it may concern:*

Be it known that I, MOSES J. LA BRAKE, a citizen of the United States, residing at Bloomingdale, in the county of Essex and State of New York, have invented a new and useful Horse-Detacher, of which the following is a specification.

My present invention relates to improvements in devices for hitching horses and the like to vehicles, and it has for its object to provide an improved device of this character whereby the horse is effectually attached to the vehicle, although, in case a runaway or emergency should occur, the horse may be instantly detached, thus avoiding injury to the occupants of the vehicle and probably saving the horse from injury.

To these and other ends, the invention comprises the various novel features of construction and combination and arrangement of parts, which will be hereinafter more fully described, and pointed out particularly in the claim appended hereto.

In the accompanying drawings, Figure 1 is a perspective view of a horse detacher constructed in accordance with my present invention. Fig. 2 represents a vertical longitudinal section through the swingletree. Fig. 3 is a bottom plan view of the swingletree.

Corresponding parts in the several figures are indicated throughout by similar characters of reference.

The horse detacher shown in the present embodiment of the invention is applied to an ordinary vehicle wherein 1 designates a box or body, 2 the shafts, and 3 the bolster to which the shafts are attached by means of thill coupling members 4 and 5 extending forwardly from the bolster and coöperating with the thill members 6 and 7 on the rear ends of the shafts, a rod or pin 8 extending between the couplings and serving as connections between the latter and the shafts.

The shafts are provided with a swingletree 9 which is pivoted at 10 in the usual or any preferred manner, and it is provided with a pair of guiding grooves 11 and 12 extending inwardly from its opposite ends and in alinement with one another, the grooves being enlarged toward the ends of the tree to receive the trace fastening devices 13 and 14 which are operable in a direction longitudinally of the tree, the reduced operating extensions 15 and 16 extending inwardly within the respective guiding grooves and having helical compression springs 17 and 18 interposed between their inner ends and a central partition 19, the pivot passing through the latter. The trace attaching devices are preferably composed of flat metal of a suitable thickness which is presented edgewise in the direction in which the tension of the traces operates, and they are doubled flatwise at their ends to provide a suitable attachment for the apertured ends of the traces, the rear edges of the trace attaching portion being preferably sloped inwardly to form recesses 20 and 21 which serve to prevent accidental disengagement of the traces.

Mounted in coöperative relation with the trace attaching devices are the trace retainers 22 and 23 which are pivoted at points adjacent to the opposite ends of the tree and are provided with downturned ends 24 and 25 which extend transversely of the trace attaching devices and coöperate with the traces to prevent their disengagement, while the trace attaching devices are in substantial alinement with the tree, the pivotal connection between the retaining devices and tree permitting them to be turned so as to carry the retaining projections thereon out of coöperative relation with the attaching device, permitting the traces to be easily attached and detached, during the ordinary operations of hitching and unhitching the horse.

In order to effect instantaneous releasing of the horse, in case of a runaway or other emergencies, the relatively movable trace attaching devices are connected for simultaneous operation, the devices employed in the present instance embodying the lazy tongs composed in the present instance of a pair of arms 26 and 27 pivoted intermediately at 28 and having their forward ends pivotally connected at 29 and 30 to the inner ends of the respective trace attaching devices, the forward ends of these cross arms being pivotally attached to the operating links 31 and 32, the latter having their opposite ends pivotally attached to the connection 33. An elongation of the lazy tongs in a direction forwardly and rearwardly of the swingletree will cause a corresponding contraction of the rear extremities of the arms 26 and 27 and producing in turn a proximating movement of the trace attaching devices with which they are connected. As the ends of the latter are retracted inwardly beyond the ends of the tree, the trace ends will be automatically released.

Any suitable means may be employed for operating the lazy tongs, these operating devices being located on any desired part of the vehicle, the devices shown in the present instance embodying a shaft 34 journaled in the bearings 35 and 36 secured to the bottom of the wagon box and having a treadle or crank 37 at one end and an operating crank 38 at its opposite end, an operating bar 39 being connected at its rear end with the operating crank and having a link 40 connecting its forward end to the connection 33, the link connection permitting a relative vertical movement of the shafts within given limits without interfering with the connection between the trace attaching devices and their operating means.

In order to facilitate the passage of the horse between the shafts, it is preferable to provide the saddle strap with a sleeve 41 at each side and adapted to fit over the respective shaft ends, stops 42 serving to limit the motion of the sleeves rearwardly on the shafts, and the hold-back strap 43 extends from the breeching to a buckle or hook 44 on the sleeve, the stops 42 sustaining the strain of the hold-back straps. The breeching is also held in place on the horse by means of looped straps 45 that fit loosely over the traces.

Hitching may be accomplished in the usual manner, that is, by turning the retaining devices to permit the trace ends to be fitted over the respective ends of the attaching devices, the retaining devices being then returned to operative position to prevent accidental disengagement of the traces. The horse is backed into the shafts after the sleeves of the harness have been fitted over the shafts. Whenever it is necessary or desirable to immediately release the horse from the vehicle, it is only necessary to depress the treadle 27 by the foot, or otherwise, and the rearward movement thus imparted to the actuating lever will cause an elongation of the lazy tongs and a consequent proximating movement of the trace attaching devices, the upper ends of the latter being drawn inwardly beyond the ends of the tree and thereby disengaging the traces, and as the horse moves forwardly, the sleeves of the harness will pass off the forward ends of the shafts.

The trace attaching devices are retained in their respective guiding grooves on the swingletree by means of metal ferrules 46 and 47 at the ends of the swingletree and at their inner or proximate ends by means of a plate 50 secured to the underside of the swingletree, the plate also coöperating with the forward ends of the lazy tong arms to support them in a horizontal position.

After the operating devices have been actuated to release the traces, the shafts will be lowered until the inner sides of the arms 26 and 27 of the lazy tongs engage the oppositely inclined shoulders 48 and 49 adjacent to the pivot for the swingletree, thereby preventing further elongation of the lazy tongs, and as the latter are connected to the operating shaft, and the pivotal centers of the shafts are offset below the connections, there is coöperation between the bar 39, crank 38 and the front of the wagon body, so that the shafts will be supported in readiness to receive the horse between them, or in a position above the ground so that they are protected from injury.

Of course, the invention may be applied to vehicles hitched up with more than one horse, in which case the lazy tongs of the several swingletrees would be connected to a common operating member which in turn is connected to the operating means on the body of the vehicle.

What is claimed is:—

In a device of the character described, a swingletree provided with trace-fastening members normally projecting beyond the ends of the swingletree, said swingletree also having shoulders on opposite sides of its pivot, and an operating means for the trace-fastening members, comprising lazy tongs having members connected to the trace-fastening members and arranged to engage the shoulders on the swingletree when the said trace-fastening members are retracted, a link secured at one end to the lazy tongs, a bar connected at one end to the other end of the link, and a rock-shaft having a crank connected to the other end of the bar, said bar coöperating with the front of the vehicle body to prevent the shaft from dropping when the horse is detached.

In testimony that I claim the foregoing as my own, I have hereto affixed my signature in the presence of two witnesses.

MOSES J. LA BRAKE.

Witnesses:
 CHAS. J. RILEY,
 D. G. ROBARE.